US006711552B1

United States Patent
Kay et al.

(10) Patent No.: US 6,711,552 B1
(45) Date of Patent: Mar. 23, 2004

(54) APPARATUS AND METHOD FOR SAVING COMMERCE RELATED INFORMATION IN A BROADCAST PROGRAMMING NETWORK

(76) Inventors: Matthew W. Kay, 8 Charles Everett Way, Hingham, MA (US) 02043; Matthew J. Laughlin, 228 River St., Norwell, MA (US) 02061; Colin P. Campbell, 60 Robinwood Rd., Norwood, MA (US) 02062

( * ) Notice: Subject to any disclaimer, the term of this patent is extended or adjusted under 35 U.S.C. 154(b) by 79 days.

(21) Appl. No.: 09/645,601

(22) Filed: Aug. 25, 2000

Related U.S. Application Data (63) Continuation of application No. 09/384,182, filed on Aug. 27, 1999.

(51) Int. Cl.[7] .............................................. G06F 17/60
(52) U.S. Cl. ...................... 705/26; 725/109; 380/211; 348/564
(58) Field of Search ...................... 705/26, 27; 348/461, 348/564, 906; 380/211; 709/203; 725/68, 109

(56) References Cited

U.S. PATENT DOCUMENTS

| | | | | | |
|---|---|---|---|---|---|
| 5,539,822 | A | * | 7/1996 | Lett ............................ | 380/211 |
| 5,592,551 | A | * | 1/1997 | Lett et al. ...................... | 380/20 |
| 6,020,880 | A | * | 2/2000 | Naimpally ................... | 348/906 |
| 6,020,883 | A | * | 2/2000 | Herz et al. ................... | 345/721 |
| 6,029,141 | A | * | 2/2000 | Bezos et al. .................... | 705/27 |
| 6,100,884 | A | * | 8/2000 | Tomita et al. ............... | 345/721 |
| 6,275,268 | B1 | * | 8/2001 | Ellis et al. ................... | 348/564 |
| 6,317,885 | B1 | * | 11/2001 | Fries .......................... | 725/109 |
| 6,342,926 | B1 | * | 1/2002 | Hanafee et al. ............. | 348/461 |
| 2002/0035728 | A1 | * | 3/2002 | Fries ........................... | 725/68 |
| 2002/0042813 | A1 | * | 4/2002 | Ullman et al. ............... | 709/203 |

FOREIGN PATENT DOCUMENTS

| WO | WO9731479 A1 | * | 8/1997 | | |
|---|---|---|---|---|---|
| WO | WO 97/31479 | * | 8/1997 | ............ | H04N/7/10 |
| WO | WO 99/09744 | * | 2/1999 | .......... | H04N/7/173 |
| WO | WO 01/041430 A1 | * | 6/2001 | .......... | H04N/5/445 |

OTHER PUBLICATIONS

Business editors, "PowerTV/Spyglass Deal Creates the Foundation for PowerTV Interactive Television Applications", Business Wire; New York ; Feb. 25, 1998, extracted from Internet on Feb. 14, 2002 from http://proquest.umi.com.*
Press Release, An Introduction to Interactive Television, © 1995 IBM Corporation, extracted from Internet on Feb. 14, 2002 fro www.google.com.*
P. 361, Microsoft Press, Computer Dictionary, 1997.*
Product Overview, version 1.5, Revision 103, Dec. 9, 1997, pp. 1–14, under the head, 3,23, Stream Manager.*

(List continued on next page.)

Primary Examiner—Jeffrey A. Smith
Assistant Examiner—Yogesh C. Garg
(74) Attorney, Agent, or Firm—Antonelli, Terry, Stout & Kraus, LLP (57) ABSTRACT

An apparatus for saving commerce information in a broadcast programming network includes a communications device capable of being tuned to receive any of multiple broadcast video programming reception channels. The communications device is also capable of receiving commerce information, including a list identifying a plurality of available products. A processor is provided to display the list on a display screen simultaneously with the broadcast vide programming being received. An input device enables a user to select one or more items from the displayed list of produces and to store the one or more selected items for retrieval and use at a later time.

27 Claims, 9 Drawing Sheets

OTHER PUBLICATIONS

Scientific–Atlanta, Inc. 1997 Summary Annual Report, pp. 1–24. This report can be downloaded from www.scientificatlanta.com.*

Press Release, Scientific–Atlanta's Explorer 2000 Digital Set–Top Terminals to be Deployed in Comcast's Baltimore Cable TV System, PR Newswire; New York; Dec. 10, 1997, extracted from Internet http://proquest.uni.com on Aug. 20, 2002.*

Press Release , An Introduction to Interactive Television, 1995, an IBM Corporation release extracted on Internet from http://www.hursley.com/misc/xw–itvintro on Aug. 20, 2002.*

Prodcut Overview, version 1.5, Revision 103, Dec. 9, 1997, pp. 1–14, under the head, 3,23, Stream Manager.*

Hyotylainen, Mika, . . Set–Top–Boxes, Department of Industrial Management, Helsinki University of Technology, written, Jun. 4, 1998 extracted on Internet from http://www.tml.hut.fi/opinion/Tik–111.350/1998/esitykset/Set–top–boxes/multi on Aug. 20, 2002.*

Press Release, PowerTV/Spyglass Deal Creates the Foundation for PowerTV Interactive Television Application , Business Wire; New York; Feb. 25, 1998; Business Editors, extracted from Internet http://proquest.uni.com on Aug. 20, 2002.*

* cited by examiner

APPARATUS AND METHOD FOR SAVING COMMERCE RELATED INFORMATION IN A BROADCAST PROGRAMMING NETWORK

This application is a continuation of application Ser. No. 09/384,182 filed on Aug. 27, 1999 (pending).

BACKGROUND OF THE INVENTION

This invention relates to a I interactive television commerce system.

The Internet is growing rapidly and is emerging as a significant interactive medium for entertainment, communications, research, education and e-commerce. Although Internet access has historically required a personal computer, it may be desirable for consumers to receive electronic information and entertainment services through their television sets. Some consumers may have little need for a personal computer because it can be costly and difficult or complicated to use. A television-based approach to e-commerce thus may be a better alternative for many consumers.

A digital broadband delivery system (DBDS) is an architecture currently being deployed by cable television system operators, referred to here as multiple system operators (MSO). The terminology used here is essentially that of Scientific-Atlanta, Inc., but the components describe could be used in other systems. DBDS allows the MSOs to offer their subscribers digital content that looks better than cable transmitted analog programs, and allows more digital channels to run on the same cable wire (at least 8 times as many). DBDS also offers two-way messaging between the cable network and set top boxes, allowing MSOs to offer customers interactive applications such as near video on demand and email. DBDS is designed as a client server network with client applications running on set top boxes that communicate with an application server that provides the content for the client applications.

DBDS has several components that work together to deliver these broadband digital services to consumers. An log set top boxes are replaced by digital set top boxes, referred to as digital home communications terminals (DHCTs). A DHCT is essentially a small network computer that provides a subscriber with the ability to run multiple applications. It also provides Internet protocol (IP) connectivity back to a server via a hybrid fiber coax (HFC) line wire to the subscriber's home to allow an application running on the DHCT to interact with the DBDS.

A digital network control s stem (DNCS) is a server, typically UNIX based, that controls the configuration of the e tire DBDS, routine DBDS maintenance, SNMP monitoring, the broadcasting of data to the set tops, and the registering of additional applications that run on the DBDS. One DNCS can currently handle up to two hundred thousand subscribers.

A broadcast file system (BFS) is a component of the DNCS and is essentially a file system containing system data (such as DHCT configurations) and application data. This file system is continuously broadcast in a carousel fashion over the DBDS via an inband data path (IDP) and an out-of-band data path (ODP). DHCTs can then access the BFS in much the same way that a PC accesses a hard drive.

The IDP is a 27 Mbps data channel that the DHCTs tune to, much like any other programming channel. The path i physically provided by a broadband integrated gateway (BIG) and an inband quadrature amplitude modulator (QAM). In essence, these pieces of hardware are employed o create a 27 Mbps path over which the BFS is continuously broadcast to the DHCTs. Once the DHCT is tuned to the data channel, it can read the BFS data carousel at his high speed. This is useful for loading a new application on the DHCT as well as in any situation where fast access to the BFS is required. The IDP is one-way; no programming content can be received while the IDP data is being read.

The ODP is a data channel that can be accessed while programming content is being sent to the DHCT. The two components that make up the ODP are a forward data channel (FDC) that broadcasts out to the DHCTs and a reverse data channel (RDC) that receives data from the DHCTs, both at T1 speed. The FDC interface to the HFC is provided by a quaternary phase shift key (QPSK) modulator. The RDC interface to the HFC is provided by a QPSK demodulator. In essence, this equipment functions as a modem to bridge the HFC to an Ethernet component of the DBDS. The FDC and RDC are used by server applications to communicate with the DHCTs.

Cable head end application servers reside on the same IP network as the DNCS, and provide a hardware platform for running server based software applications that will be provisioned to the DHCTs, such as near video on demand and email. Services that run in the DBDS have a component running on the application server and are registered with the DNCS.

SUMMARY OF THE INVENTION

The present invention includes a commerce control network (CCN) system and methods for obtaining product information and for purchasing products through a two-way interactive television system.

In one aspect, the invention includes an architecture that has client applications residing in individual set top boxes; a commerce transfer point (CTP), including at least one commerce application server (CAS) and at least one head end database server (HEDS); and a remote commerce control point (CCP) coupled to one or more CTPs. The commerce application server communicates between the client applications and the HEDS, which stores commerce control network data such as product and broadcast information. The HEDS communicates with the CCP to transfer commerce control network data back and forth. The CCP would typically be coupled to a number of HEDS, and the data in each HEDS would be periodically replicated in the CCP.

The system of the present invention can provide product information or a purchase screen for a list of products in a manner that may or may not be related to underlying broadcast content (programming). In the case of the product information being related to the programming the information can be provided to the user in response to a user input. For example, a user can press a certain key on the television remote control upon seeing an icon during programming and access an electronic buying guide with a purchase screen for products that are related to that programming. The buying guide can also be provided in a manner unrelated to the programming in response to a user input from the remote control to enter a buying guide mode. In that case, the products that are offered may be standard product list, or they may be a list based on information about the particular user.

The information that is displayed may be on a translucent screen, on a screen that blocks part of the programming, or on a full screen. The electronic buying guide preferably has a scrollable list of items, a detail window that shows an item in the list when the user has selected that item, and a video window that captures the programming, all displayed at the same time.

In addition to the foregoing functionality, the system of the present invention also allows the user to select a product and store it in a server (such as in the HEDS) in a list that is personalized for the particular user and accessible so the personalized list can be retrieved at a later time by the user. This accessible and personalized list in essence functions as a persistent shopping cart containing the user's favorite items.

The icon displayed with the programming can be scheduled to appear by the client application, or triggered by data provided in a broadcast signal, such as in a vertical blanking interval (VBI). In the former case, the system for providing the icon is synchronized in scheduling terms with the programming based on information provided by the head end database server. When the user makes an input in response to the icon, further information is accessed from a memory for display. The icon and the information in memory are preferably decoupled such that the information can be modified separately, preferably in a manner that is accessible to the information provider.

Another feature of the system of the present invention is the ability to provide a call option so that the user can cause a telephone call to the user to be initiated by a product provider.

The system of the present invention may be used in a widely available television network, such as a cable television system or a satellite television system available over a wide area and to a very large number of users. The system of the present invention is simple to operate, in that it is completely functional from a television remote control, and it provides enhancements to the traditional broadcast entertainment programming currently available through cable and satellite operators. Other features and advantages will become apparent from the following detailed description, drawings, and claims.

DETAILED DESCRIPTION

Figure 1:
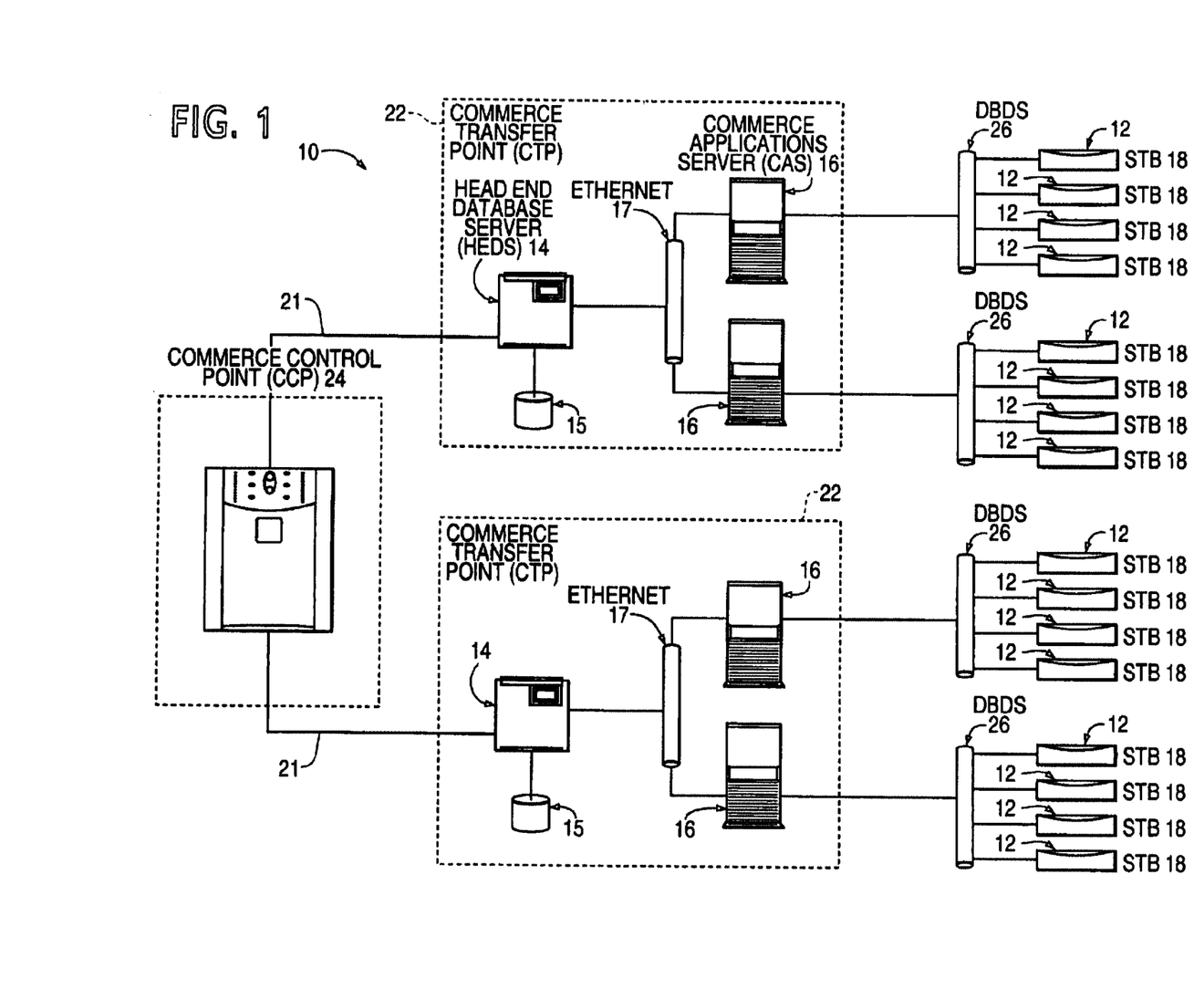
FIG. 1 is a block diagram of a commerce control network according to the present invention.

Referring to FIG. 1, the present invention includes an interactive television commerce system, referred to as commerce control network (CCN) 10, in a interactive television system, such a cable television system described above or a satellite television system, that is widely available to a large number of users, e.g., over a metropolitan area. CCN 10 allows TV users to select, purchase, gain additional information about, and store information relating to products using a simple and convenient menu-based user interface. The system can provide product lists that may or may not be customized based on a particular channel and/or program being watched, or the product lists or other information can be tailored for the individual user.

In one instance of the system, if a user orders a product, the order can be processed by the system, the user's credit card may be billed, inventory may be updated, and the order may then be forwarded to a warehouse for shipment. In another instance, if a user orders a product, the order can be processed by the system and then forwarded to an appropriate third-party vendor for billing and fulfillment. In the latter instance, periodic status updates on the order may be provided by the vender to the system. The system [referred to here as an electronic buying guide (EBG)] is not strictly limited to "buying," but can also include obtaining product information and samples.

CCN 10 of the present invention has a three-tiered architecture with client applications 12, a commerce transfer point (CTP) 22, and a commerce control point (CCP) 24.

Client application 12 runs in a set top box (STB) 18 on a set top operating system (OS), such as the PowerTV Set Top OS, which is currently being provided with a Scientific-Atlanta DHCT, or on top of a Windows CE OS. In the case of the PowerTV OS, client application 12 may be created using a PowerTV development kit. The PowerTV OS provides a full-featured application programming interface (API) that allows a developer to isolate the application code from the hardware level of the set top box.

Client application 12 provides the user with a convenient user interface that is controllable by the user with a standard STB remote control to allow viewing, purchasing, or obtaining information about products, and provides messaging to and from the CTP with which it communicates. The functionality to call the client application is built into a variety of resident applications provided by third party vendors and running on STB 18. The viewer can thus access the application via a remote control button while watching TV. The term "set top box" is meant broadly to include a processing functionality with a television; that functionality could be integrated into the television itself, for example, and thus need not be literally in a separate standalone "box."

A client application executable is loaded onto STB 18 by a digital communications network (DBDS) 26 when a resident application in the STB determines that the user has tuned to a channel that is configured to run the client application.

CTP 22 includes one or more commerce application servers (CAS) 16, each in communication with a number of set top boxes; one or more head end database servers (HEDS) 14, each connected to one or more CASs; a private Ethernet network for connecting CASs and HEDSs; and private wide-area network connection 21 for communication with CCP 24. CT 22 handles all of the requests from the client applications 12, and serves as a data conduit to CCP 24. In the case of a cable television system, the CTP is preferably located at the cable head end.

CAS 16 is responsible for registering CTP 22 for use within the DCN of the local MSO, and for providing client application 12 to DBDS 26 for distribution to set top boxes 18. The CAS also serves as the point of communication between client applications 12 and HEDS 14, and thus CAS 16 handles all client application 12 requests and forwards them to HEDS 14. The number of CAS 16 machines may be set as needed based on the number of STBs 18.

CAS 16 is preferably implemented by a small server, such as a Compaq Proliant Model 1600R running Windows NT, preferably with message queuing software such as Microsoft Message Queue (MSMQ). CAS 16 utilizes at least one Ethernet card to access HEDS 14 and at least one asynchronous transfer mode (ATM) card to access DBDS 26 via an ATM switch, such as a Xylan ATM switch. The system can have one more CAS 16 than is needed to handle usage so that in the event of a failure of one CAS, the overall system will still handle the full processing load.

Figure 2:
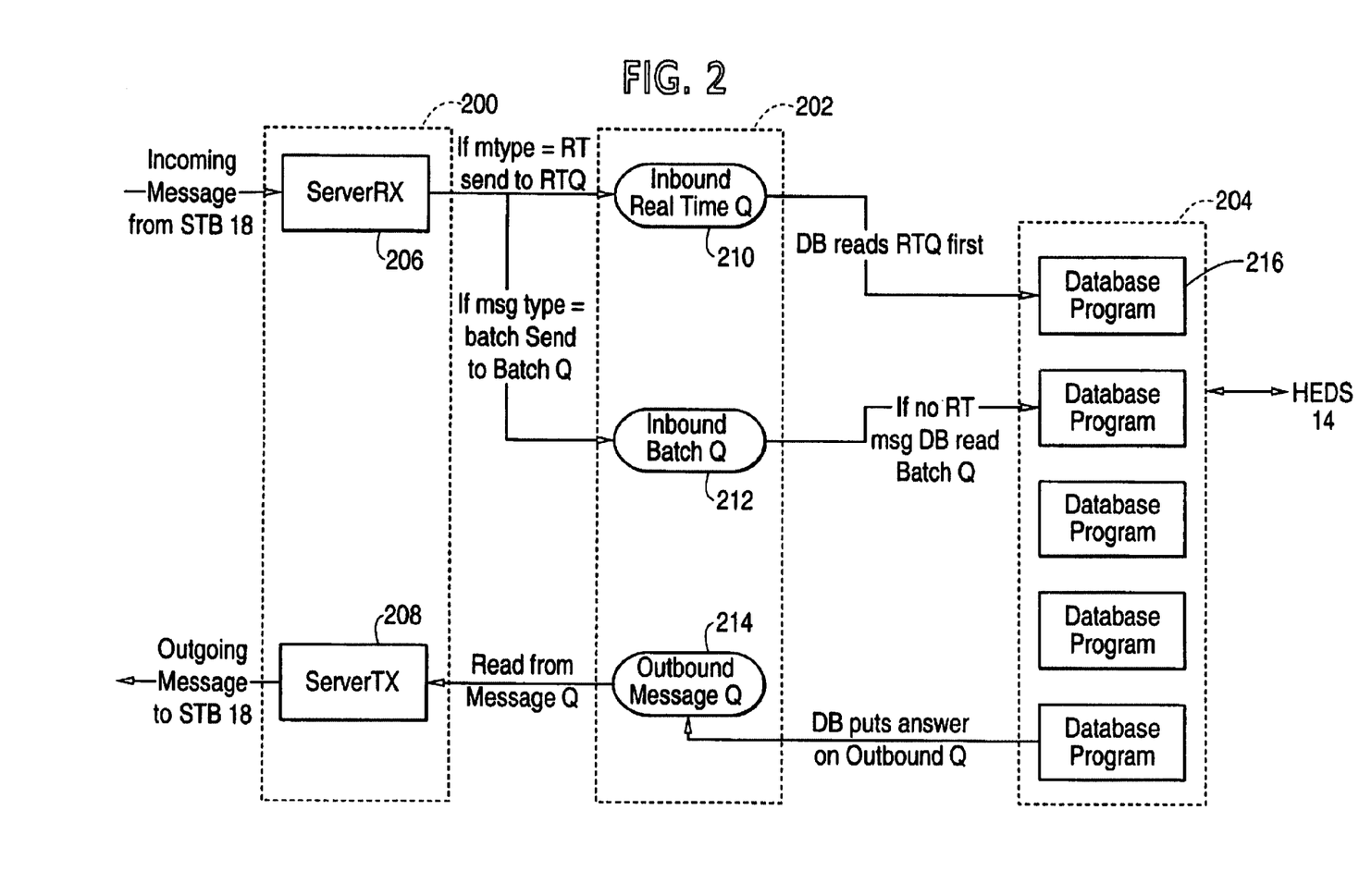
FIG. 2 is a software process diagram of the commerce applications server.

Referring to FIG. 2, CAS 16 has three components implemented in software: socket server process 200, which manages the client TCP/IP connections; message queuing component 202, which provides the message queuing functionality; and database process 204, which processes client requests and provides database access.

Socket server process 200 has at least two functions: a receive service, ServerRX 206, and a transmit service, ServirTX 208. ServerRX 206 manages client connections from a number of client applications 12, reads the client requests, and puts each such request message in an appropriate inbound queue in message queuing component 202 based on header information contained in the request. ServerTX 208 scans the outbound queue of message queuing component 202 for replies from the database, opens connections to the appropriate client applications 12, and forwards the replies to the clients.

Message queuing component 202 is preferably implemented as multiple queues. For ServerRX 206 communications, there are at least two queues: inbound real time queue (IRTQ) 210 and inbound batch queue (IBQ) 212. The request messages from the client applications have header information that indicates the response priority. A client application request whose header information indicates that the request requires an immediate answer will be placed in the real time queue 210. A client application request whose header information indicate that the request does not require an immediate answer will be placed in the batch queue 212.

Database process 204 has a number of single database programs 216, each of which can service incoming client application requests from message queuing component 202. Each database program 216 processes one inbound request from message queuing component 202 at a time. Each database program 216 first processes requests in IRTQ 210. If IRTQ 210 is empty, each database program 216 processes requests in IBQ 212. Database program 216 can then submit a request to the associated HEDS 14 and wait for a reply. When a reply is received, database program 216 forwards that reply to outbound message queue (OMQ) 214. Messages are retrieved from OMQ 214 by ServerTX 208, which functions as described above.

The use of these multiple queues and database programs helps make possible the processing of a large number of requests by users through their client applications at the same time.

Referring again to FIG. 1, each CTP 22 contains at least one HEDS 14 to provide all persistent data storage, including customer information, order status, program data, item information, and item descriptions. HEDS 14 is preferably implemented by a small server, such as a Sun Sparc 1 running Solaris or an IBM RS6000 Model C20 running AIX, and preferably with relational database management system (RDBMS) 15, such as an Oracle RDBMS. The use of an RDBMS is desirable because an RDBMS allows for scalable access to large mounts of data. HEDS 14 preferably has at least one Ethernet card to communicate wit one or more CASs 16 via a private Ethernet network 17 and at least one Ethernet card to communicate with CCP 24 via wide-area network 21. HEDS 14 also has a console for either local or remote maintenance and operation.

Figure 3:
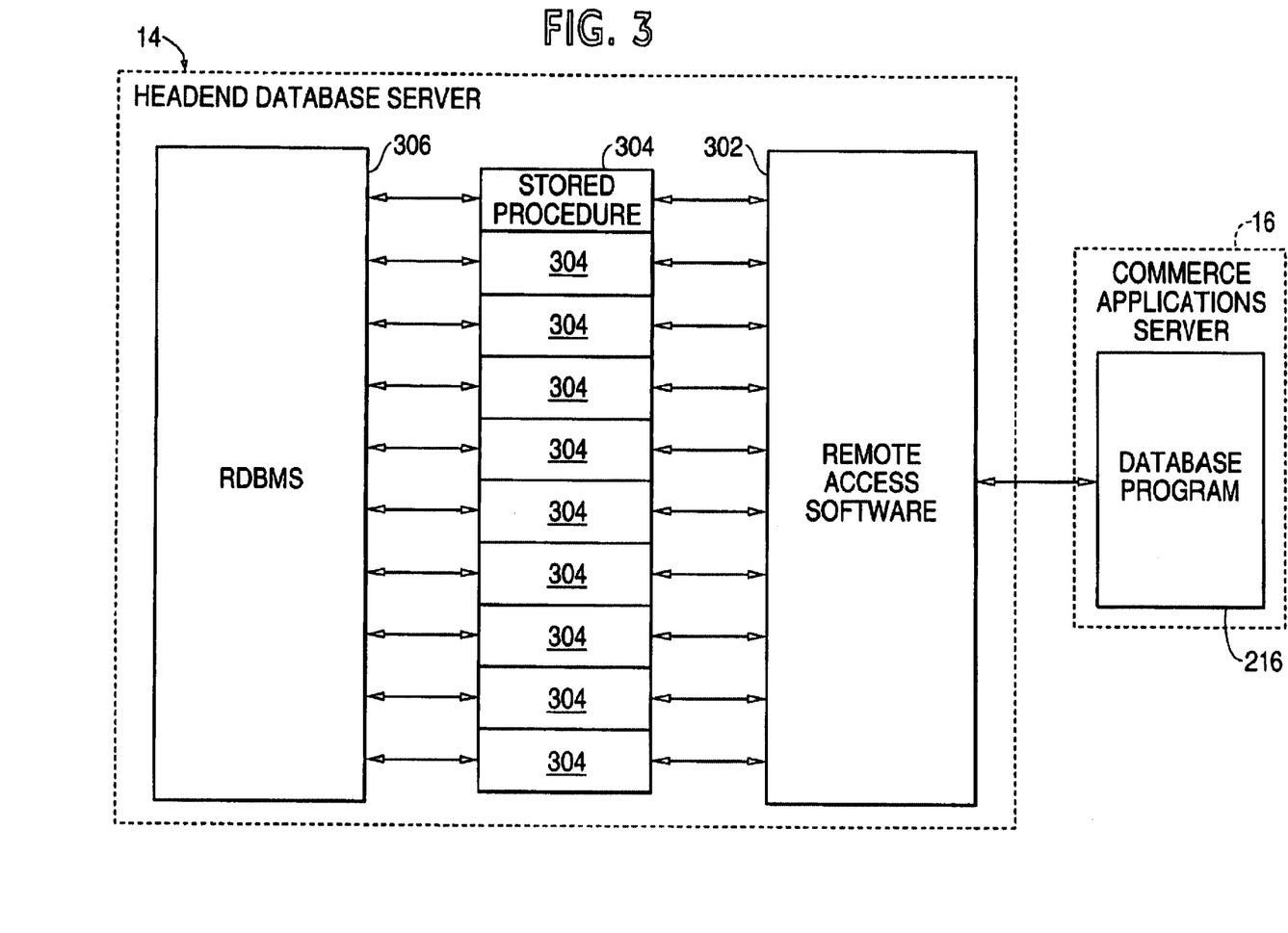
FIG. 3 is a software process diagram of a head end database server.

Referring to FIG. 3, database program 216 submits requests to HEDS 14 via remote access software 302, such s Oracle SQL*NET. The requests include information for directing HEDS 14 to execute any one of a number of stored procedures 304 on RDBMS data. Stored procedures 304 contain the business logic for supporting certain applications in the network, such as an electronic buying guide application and a quick buy application (discussed below).

RDBMS data is populated y multiple sources. These sources include CCP 24, which can provide data such as broadcast schedules, product lists, product information and order status information; CAS 16, which provides data from user inputs such as credit card data, pass codes, multiple user profiles and specific transaction information; and an MSO billing system, which provides household specific information including name, address, telephone number, and an unique identifier for a user's STB.

HEDS 14 combines specific transaction information with credit card information and household specific information and forwards the combined information to CCP 24 in a real time or in near real-time fashion periodically at some desired time, which may be different for different types of information (e.g., general requests for information may be transferred at a slower rate than orders from customers to purchase products). The CCP thus replicates what is in the different HEDSs in communication with it. HEDS 14 also monitors portions of the system to ensure proper operation and generates alarms to CCP 24 when problems are detected.

Figure 4:
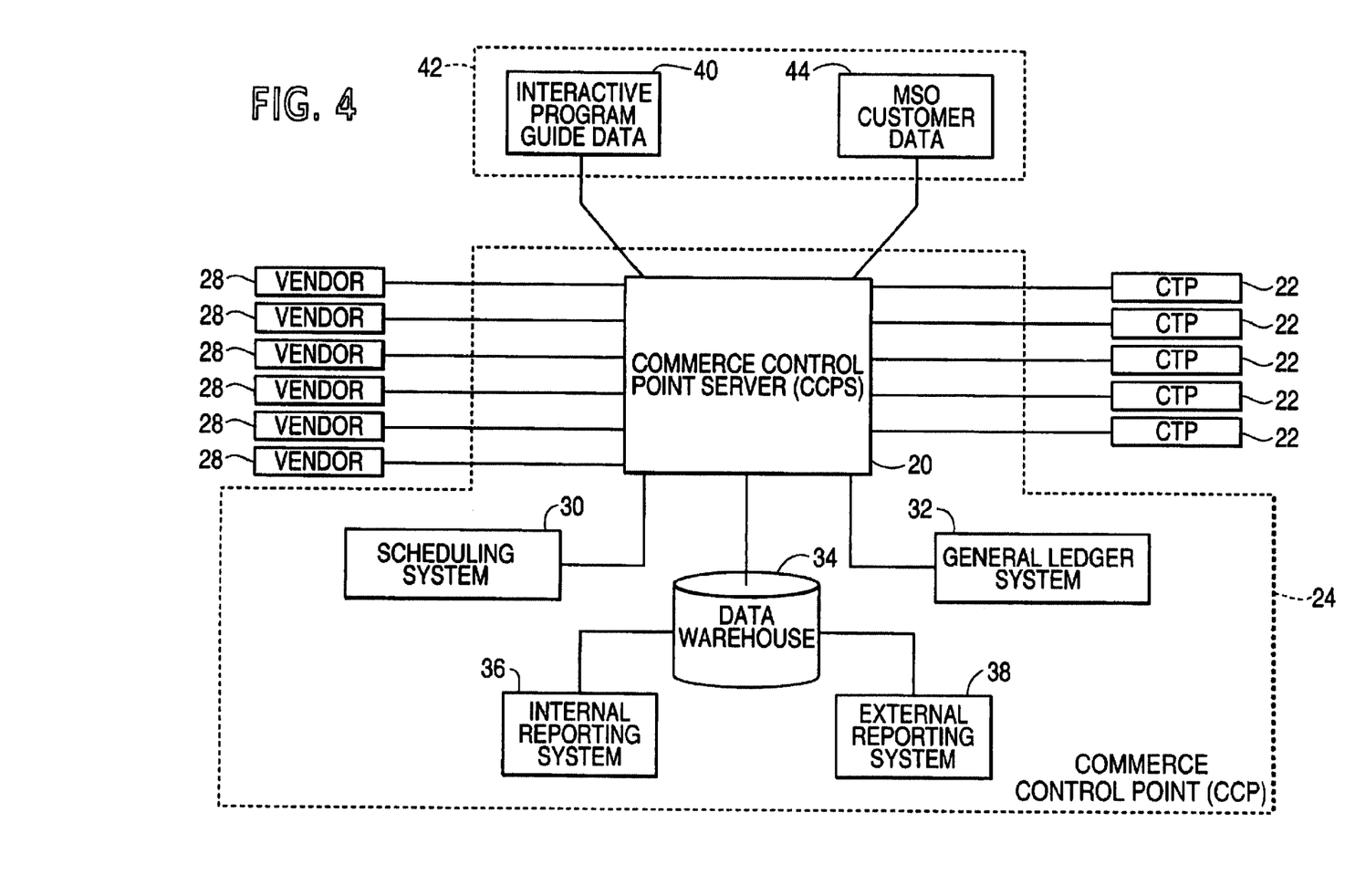
FIG. 4 is a block diagram of a commerce control point.

Referring to FIG. 4, commerce control point (CCP) 24 preferably includes at least one of each of the following components: a CCP server 20, a scheduling system 30, a general ledger system 32, a data warehouse 34, an internal reporting system 36 and an external reporting system 38. CCP server 20 can be a large, highly available UNIX based server with a separate disk farm and an RDBMS. Scheduling system 30 can be a UNIX based server with an RDBMS. General ledger system 32 can be a component of a standard accounting system software package. Data warehouse 34 can be a large UNIX based server with a separate disk farm and an RDBMS. Each reporting system can be a Windows NT workstation. CCP 24 may reside at a dedicated location or locations such as a collocation area of a telephone company central office or point of presence. CCP 24 also performs various maintenance and monitoring functions on its own systems to alert operators when any problems are detected.

CCP server 20 communicates bi-directionally with one or more commerce transfer points (CTPs) 22 and provides data, including broadcast schedules, product lists, product information and order status information, to each such CTPs 22. CCP server 20 also aggregates user data in order to create user profiles. These user profiles can be compared to a stored product list and then used to allow a product lists to be customized for groups of users or for each individual user, or to associate one of a number of product lists to each user.

CCP server 20 interfaces with vendor e-commerce systems 28 to forward sales orders, obtain inventory control information, authorize and settle credit card transactions, and provide order fulfillment. CCP server 20 can have a number of external data feeds 42. In the preferred embodiment, these feeds include an interactive program guide (IPG) data 40, which provides raw broadcast schedules, and MSO customer data 44, which provides the customer name, address and phone number associated with a unique set top box identifier.

Scheduling system 30 receives IPG data 40 and raw vendor product lists from CCP server 20, and provides to vendors a web-based interface for each vendor to designate which products from such vendor's raw product list are to be associated with which programming. The scheduling system then forwards the configured information back to CCP server 20, which in turn forwards the configured information to the appropriate CTPs 22.

General ledger system 32 an record all of the commerce control network's billable transactions downloaded from the CCP servers 20, and then can aggregate transaction information on a vendor-by-vendor basis for invoicing and financial reporting. Ledger system 32 can perform a similar function for other network participants such as MSOs.

Data warehouse 34 stores near real time image of all of the data resident in each of the CCP servers 20. This data is used by internal reporting system 36 and external reporting system 38 to generate detailed reports without using the processing resources of the CCP server. Internal reporting system 36 generates reports relevant to the operation of the CCN, such as exception reports and CCN marketing reports. External reporting system 38 generates reports configured in any reasonable manner deemed useful by vendors or other CCN participants, such as vendor sales and demographics reports.

Figure 5A:
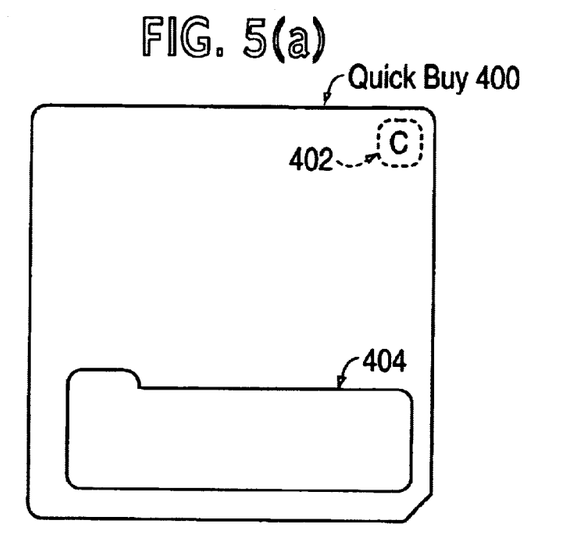
FIGS. 5(a)–5(d) are block diagrams of screen shots and portions of screen shots for the quick buy client application.

Referring to FIGS. 5(a)–5(d) in general, one embodiment of client application 12 is a quick buy application (QB) 400. Referring particularly to FIG. 5(a), when the user tunes STB 18 to a certain channel which has been pre-configured to function with the QB 400, STB 18 resident application responds by loading the QB 400 executable file from the MSO's head end network file system (such as the Scientific Atlanta broadcast file system). Once loaded and running in the memory of a STB 18, QB 400 displays the video and audio portions of the tuned channel and can display a quick buy icon 402 indicating that the tuned channel is QB 400 enabled. In the preferred embodiment, the icon is static; however, it could also be a dynamic mix of graphics and text, and it can be flashed at certain times to encourage the user to enter a purchasing mode.

The presence of quick buy icon 402 informs the user that QB 400 is running and therefore that the user may enter a purchasing and product information mode by pressing a defined key on the user's remote control. In an alternative embodiment, the user may enter a purchasing mode by pressing a defined key on the STB remote control even when the icon is not present to enter QB.

Once the user enters the purchasing mode, QB 400 sends a client request to commerce transfer point (CTP) 22, which processes the request as described above and sends a database reply containing the list of product information associated with the tuned channel and current time, i.e., the programming. Alternatively, CTP 22 can send a database reply with a list of products or product information that may be tailored to that user, or may be general product information provided to all users.

Figure 5B:
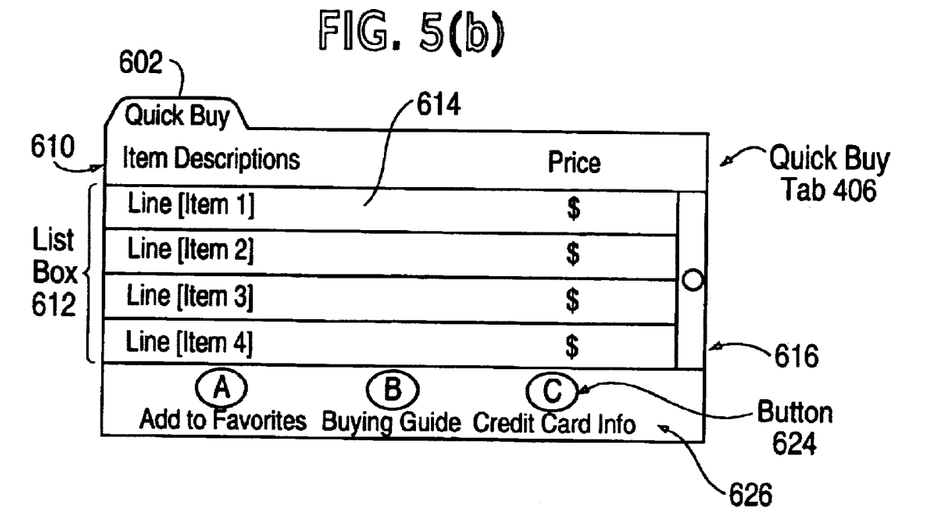

Referring to FIG. 5(b), QB 400 displays a tab screen 600 containing a product list and certain product information, such as prices for each of the items. A possible embodiment of the tab screen 600 displayed by QB 400 could be configured as shown in quick buy tab 406. Quick buy tab 406 may be translucent and overlays a portion of the video of the tuned channel. When quick buy tab 406 is displayed, QB 400 can remove the quick buy icon, if any, from the television screen.

The user can use standard tab screen navigation techniques (described below) to select a line item 614 from a list box 612 by pressing a defined key on the user's STB 18 remote control. The user may select a line item 614 for one of a number of purposes indicated by buttons 624 and butt n text 626. By selecting one button, the item can be saved into a customized and personalized list (referred to here as a "Favorites" list) that is stored in the CTP, such that the personalized list can be accessed at another time. By selecting another button, the user an enter the electronic buying guide discussed below. By selecting yet another button, the user can indicate a desire to purchase at the current time and then enter a credit card number.

Figure 5C:
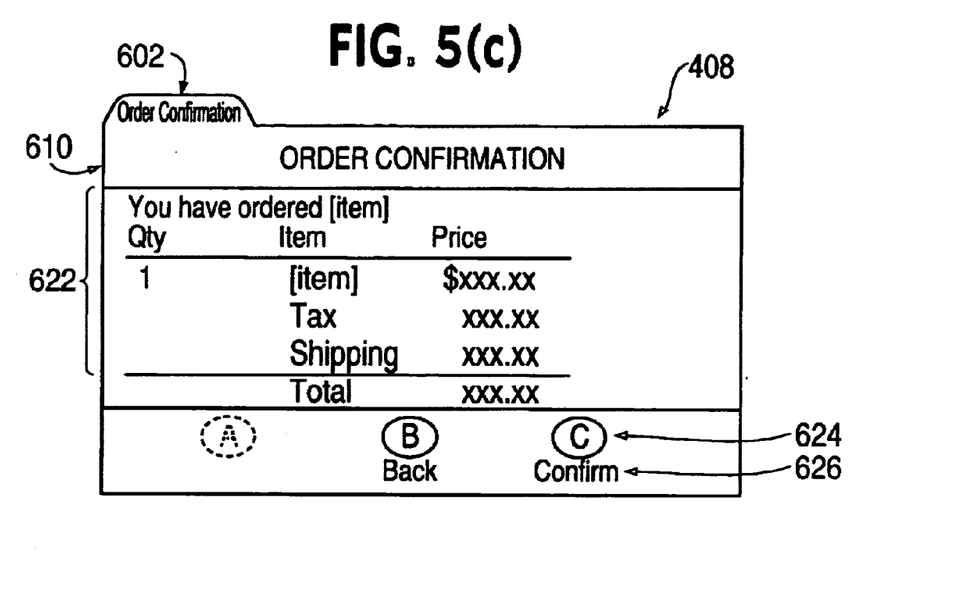

Referring to FIG. 5(c), in response to the user selecting a product to purchase and entering appropriate information (which may be configured in the client application to prevent entry for every purchase), QB 400 confirms the order by displaying a confirmation tab 408. The user can confirm the order or go back to the prior screen. If the user rejects the order by pressing a key on the user's STB 18 remote control defined by a button on the order confirmation tab 408, QB 400 redisplays quick buy tab 406. If the user confirms the order, QB 400 forwards the order to CTP 22 for processing. As discussed above, CTP 22 will forward the information to the CCP, which may handle the request, or which may forward the request to a separate vendor e-commerce system for processing.

Figure 5D:
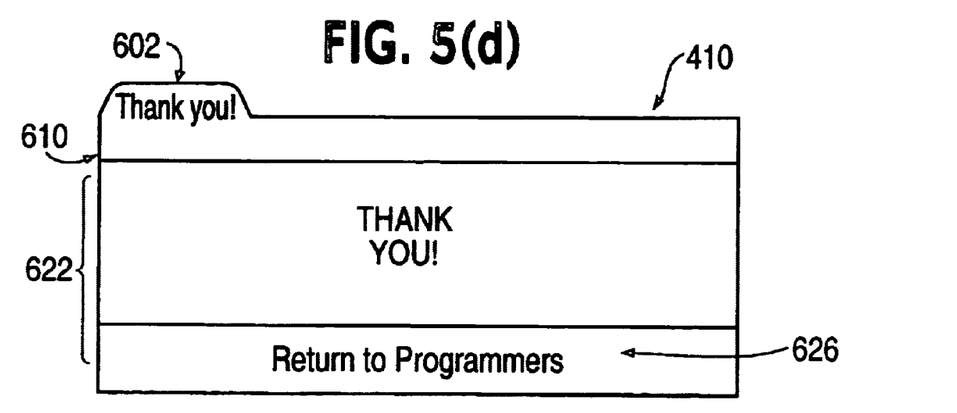

Referring to FIG. 5(d), the system then displays a thank you tab 410, removes all tab screens from the video display, and can redisplay quick buy icon 402 if configured to do so or simply remove all non-programming information from the screen.

If the product selected requires additional configuration, such as quantity, style, size, etc., prior to purchase, QB 400 launches another client application referred to here as the electronic buying guide (EBG) 500 and passes the existing purchase parameters to the EBG. EBG 500 can also be launched from QB 400 via a button shown in FIG. 5(b) on quick buy tab 406, or can be launched in other ways including via an STB 18 remote control key defined and processed by the STB 18 resident application, and via the user tuning the STB 18 to a channel dedicated to the EBG 500.

Figure 6A:
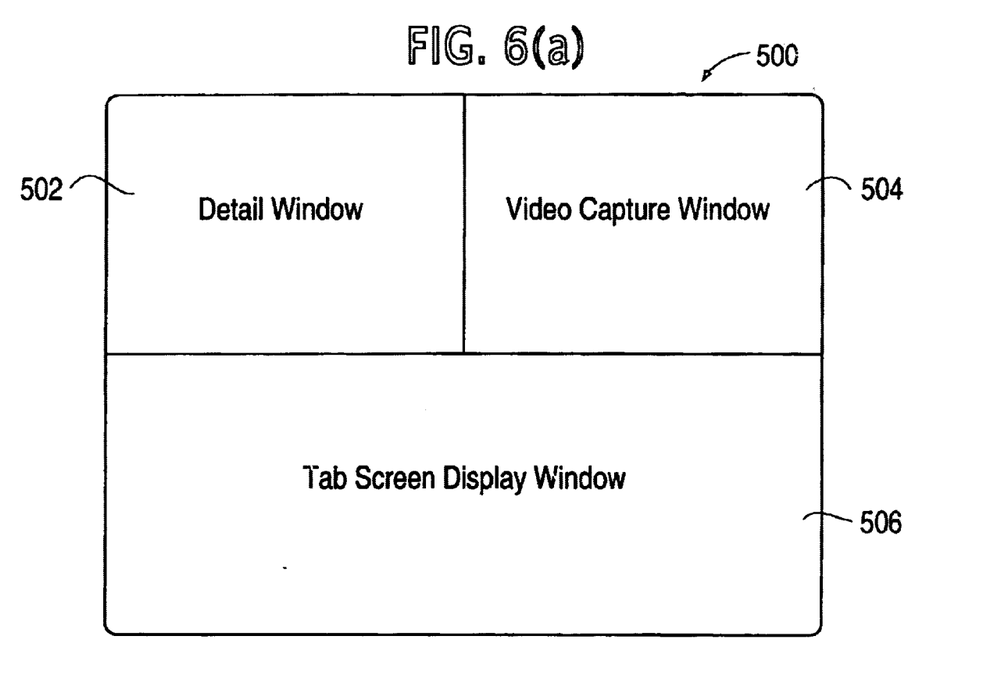
FIGS. 6(a)–6(f) are block diagrams of screen shots and portions of screen shots for the electronic buying guide application.

When EBG 500 is launched, by whatever means, the STB 18 resident application responds by loading the EBG 500 executable file from the MSO's head end network file system (such as the Scientific Atlanta broadcast file system). Once loaded and running in the memory of the STB 18, EBG 500 displays a graphic screen configured, for example, as illustrated in FIG. 6(a). EBG 500 graphic screen may include at least one detail window 502, at least one video capture window 504, and at least one tab screen display window 506.

Figure 6B:
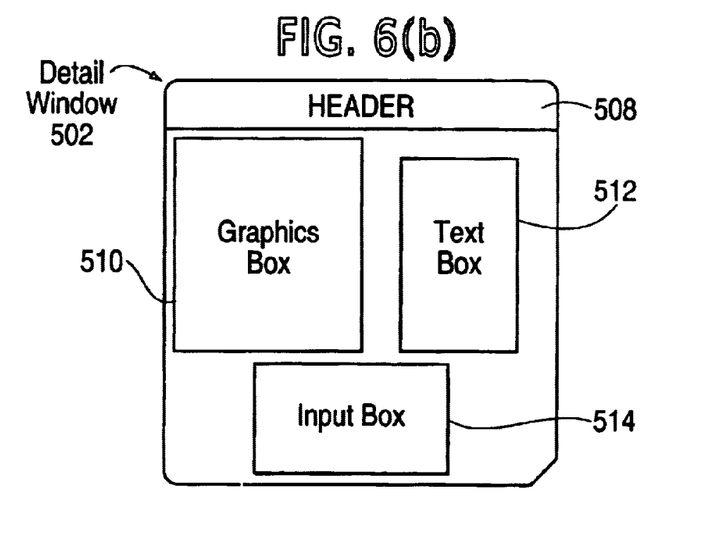
Figure 6C:
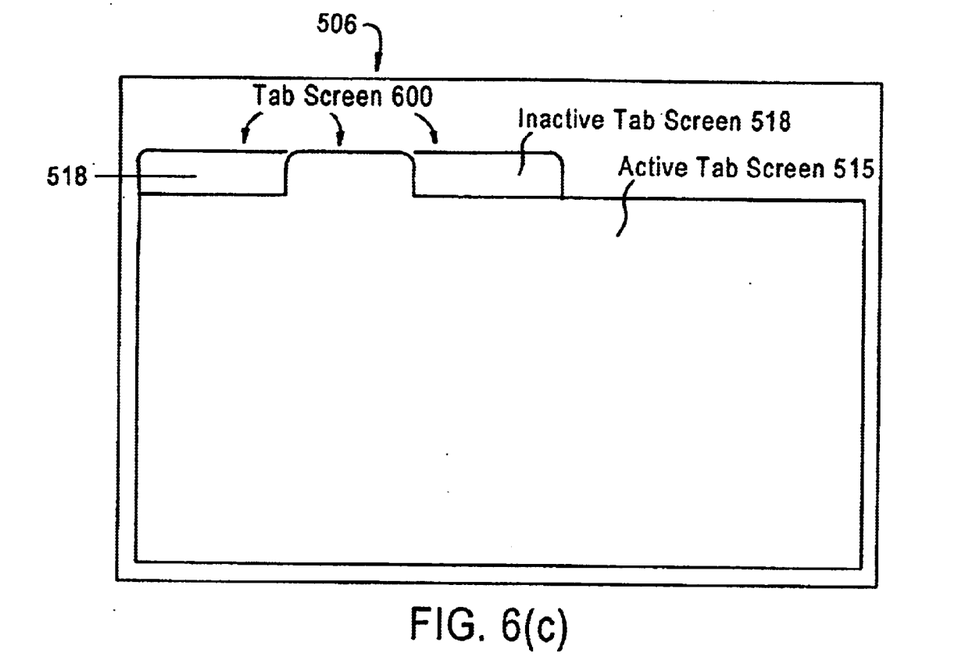
Figure 6D:
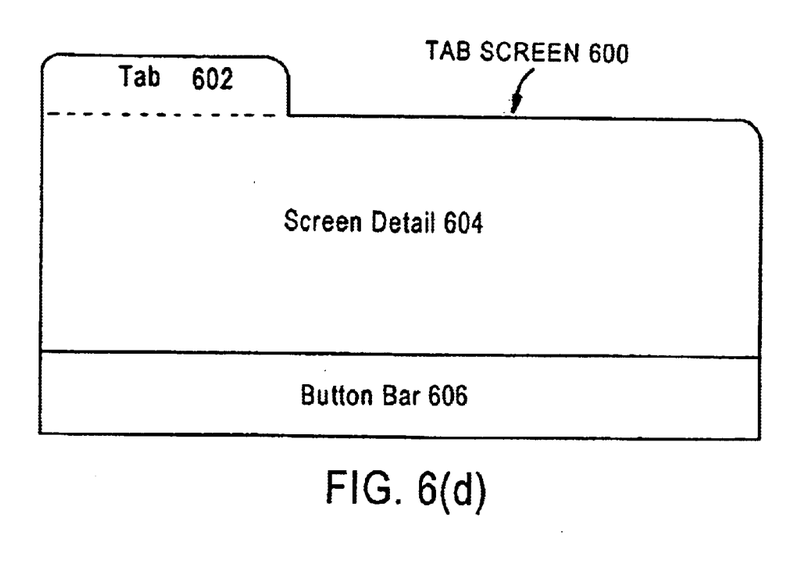

Referring to FIG. 6(b), detail window 502 provides additional detail about products that may be purchased, or for which more information can be displayed. Detail window 502 may include any of the following: a header 508, at least one graphics box 510, at least one text box 512 and at least one input box 514. Header 508 can contain text much like the text box described low. The graphics box 510 can display a picture in any one of a number of formats such as bitmap (.bmp), joint photographic experts group (JPEG), graphics interchange format (.git), etc. Text box 512 can be configured to display text in various font styles and point sizes and may or may not include a scrolling feature for text of a length exceeding the size of the box. Input box 514 is a data entry field which can be populated by th user in several ways. For example, it can be populated by the user directly from STB 18 remote control numeric keys, or by a pull down menu containing a predetermined number and type of data options from which the user can choose.

The detail window can be configured as desired to provide information about the product. Accordingly, the detail window may have text only, a photograph, a moving image, or a desired combination of text and graphics.

Referring again to FIG. 6(*a*), video capture window 504 displays video in any of a number of formats, such as MPEG or MPEG 2. The video being displayed can be captured from various sources, but it will most typically be captured from the tuned channel at the time the EBG was invoked.

Referring to FIGS. 6(*c*) and 6(*d*), tab screen display window 506 has at least one tab screen 600. When more than one tab is presented in tab screen display window 506, tab 602, screen detail 604, and button bar 606 of an active tab screen 516 are displayed, but only tab 602 of each inactive tab screen 518 is displayed. The user can switch from the active tab screen 516 to an adjacent inactive tab screen 518 by pressing a defined STB 18 remote control key such as the left and right arrow keys. In another embodiment, the user can switch from an active tab screen 516 to an inactive tab screen 518 by pressing the numeric key on STB 18 remote control that corresponds to a number assigned to a tab screen 600, which may be displayed on tab 602. When such user input occurs, the active tab screen 516 becomes an inactive tab screen 518, and the newly selected inactive tab screen 518 becomes the active tab screen 516.

Referring to FIG. 6(*d*), each tab screen 600 may include a tab 602, at least one section of screen detail 604, and at least one button bar 606. Tab 602, which generally functions to identify the tab screen 600, can display graphics or text in various font styles and point sizes.

Referring to FIG. 6(*e*), screen detail 604 within a tab screen can have several components. For example, a list 608 can include at least one header 610, at least one list box 612, at least one scroll bar 616, and a scroll bar indicator 618. As an alternative, a text component 620 can include at least one header 610, at least one text box 622, at least one input box 514 (see FIG. 6(*b*)) at least one scroll bar 616, and a scroll bar indicator 618. Header 610 can contain text much like text box 622 described below.

Figure 6E:
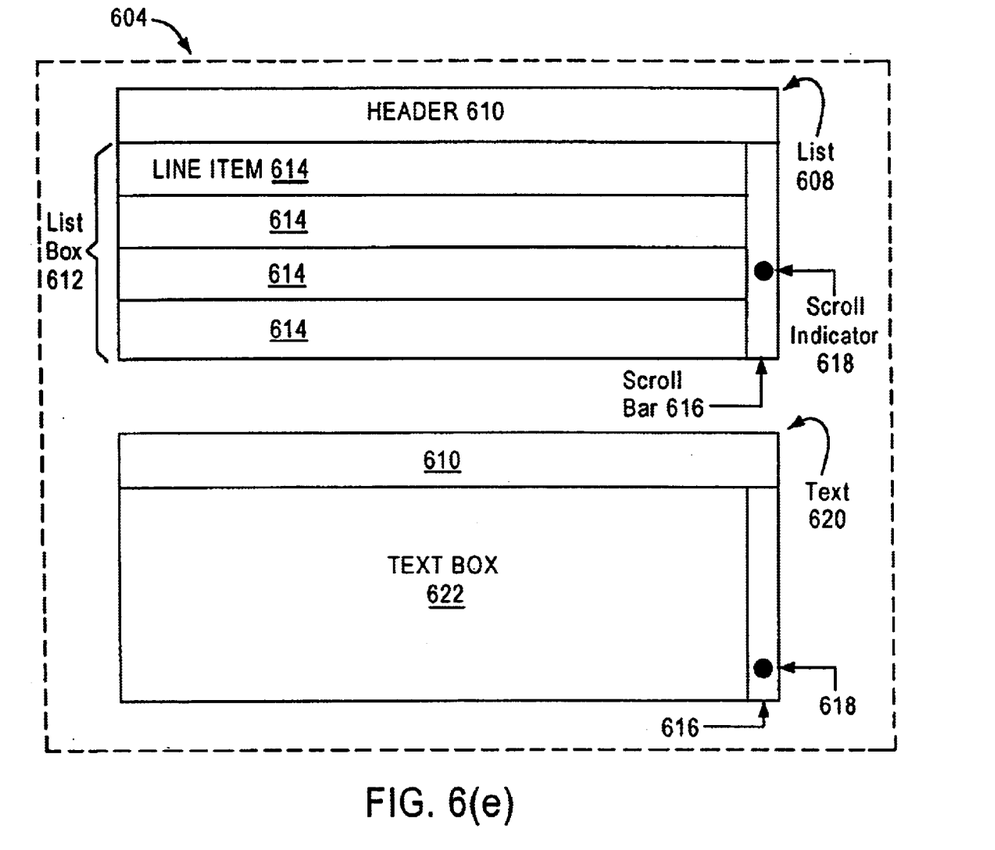
Figure 6F:
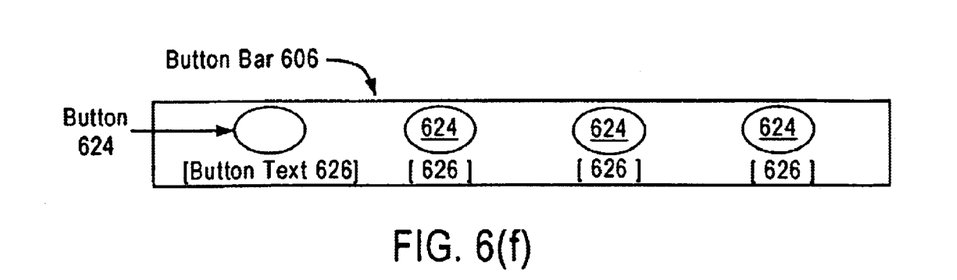

List box 612 contains at 1east one line item 614 and may be configured to display a fixed number of line items 614 t one time notwithstanding the number of items in the actual list to be displayed by list ox 612. For example, if list box 612 is configured to display four line items 614, but the list to be displayed by list box 612 contains 10 items, the user can scroll upward or downward to cause list box 612 to display the items that are not currently displayed in list box 612. As the user scrolls through list box 612, the current line item may be highlighted and the scroll indicator 618 in scroll bar 616 is repositioned relative to the current line item content position in the actual list, where scroll bar 616 represents the length of actual list. Text box 622 can be configured to display text in various font styles and point sizes and may or may not include a scrolling feature as described above utilizing scroll bar 616 for text of a length exceeding the size of the box.

Referring to FIGS. 6(*b*) and 6(*f*), button bar 606 may include one or more buttons 624 and button text 626. Button text 626 can be configured to display text in various font styles and point sizes and is generally used to identify the function of an associated button 624; however, button text 626 can also be utilized in the absence of an associated button 624 to convey information to the user. A button 624 is a virtual representation of a defined input key on a STB 18 remote control. A button 624 may be displayed on the button bar 606 graphically or textually, or by a combination of the two. The client application 12, such as the QB 400 or the EBG 500, maps the button 624 to the corresponding STB remote control key by registering its interest in such a key with the STB operating system. For example, when the user selects the mapped key on the STB remote control, the STB operating system delivers the user input to client application 12, and client application 12 in turn calls the function associated with such input.

As explained above, EBG 500 interface can be configured using any combination of detail windows 502, video capture windows 504 and tab screen display windows 506, which can each in turn be configured using any combination of their respective components.

In a typical embodiment of EBG 500, the functionality available to the user at any given time is driven by the active tab screen 516. EBG functionality presented by a given active tab screen 516 determines the configuration of the EBG interface, including the location, number and configuration of detail windows 502 and video capture windows 504. Each of the components of the EBG 500 interface provides information to the user, receives information from the user, or both. A number of active tab screens can be included in EBG 500.

One of the screens within he EBG is a quick buy tab screen 600. The functionality of such a tab is similar to that of quick buy tab 406 described above in an embodiment of the QB application. In both instances, the key function of the quick buy tab screen is to display a list of products, preferably associated with the underlying programming being displayed on he tuned channel. When the quick buy tab screen is utilized in the EBG context, the tuned channel is captured in a video capture window 504 and a detail window 502, configured in accordance with the need for information about the product, is available to display real-time detailed product information about a given product as the user scrolls through the product list. When the user selects a product to purchase, the detail window 502 can then be utilized to display further information and request user input, such as quantity, style, color, size, etc., regarding the selected product. In another instance, a video capture window can be utilized to display video information regarding the selected product.

Another screen is a favorites tab screen. The favorites tab screen can have detail similar to that shown in FIG. 6(*e*) and can function identically to the quick buy tab screen described above, except that the user, rather than the underlying programming, determines the content of the product list. The user may add items to the favorites list by tagging any item the user so designates as a "favorite" while viewing any other product list provided by any client application at any time. The favorites tab screen also provides the user with the functionality to remove items from the favorites list. The favorites list is stored in the HEDS for later retrieval as discussed in conjunction with FIG. 2, even after the client application has been closed and reopened. In other words, the storage is essentially permanent. The user can therefore delay purchase of a particular item, while the favorites list provides a convenient way to maintain the list for the user.

An order status tab screen displays a list of products recently ordered by the user and the status of each individual order. Each order listed can include a level of detail such as order date, product description and order status. In the preferred embodiment, an order's status can be Shipped, In Process, Pending, Back Ordered and Canceled. An order is "Shipped" when the vendor informs the commerce control network (CCN) that the product has in fact been shipped. An order is "In Process" when it is at a stage of processing at which the user cannot cancel the order. An order is "Pending" when it is at a stage of processing at which the user can cancel the order. An order is "Back Ordered" when the vendor informs the CCN that the vendor's inventory of such item is temporarily depleted. Back ordered orders are cancelable by the user. An order is "Canceled" when the vendor informs the CCN that he user's credit authorization has failed, the user cancels the order, or the vendor h s sold out of a limited quantity item. The order status tab screen can display each status in an appropriate color such as green for "Shipped", red for "Canceled" and yellow for all other statuses. Orders with a status of "Shipped" are removed from the user's order status list after a fixed period of time lapses. The user can obtain more information about an individual order on the order status tab screen by selecting the order for review, at which time the EBG will display additional details about the order, such as order number, shipping method, tracking number, shipping address, etc.

A settings tab screen allows the user to configure certain features of the EBG. Such settings can include payment information, shipping method, interface color scheme, security features, etc. In addition, the settings tab screen provides a method for configuring more than one user per household. Each such user can have its own security code and user profile as described below.

A profiles tab screen allow the user, or users, to store default personal data, payment data and purchase preference data. Default personal data can include information such as clothing sizes, which the EBG can use to populate clothing size fields that would otherwise have to be populated by the user. Payment data can be user-specific credit card or other data that will override the default payment data set up for the household in the settings tab screen. Purchase preference data can include user-designated product cost maximum and minimums, preferred vendors and preferred product types. Preferred product types can range from broad categories such as books, music and clothing to narrow categories such as fiction, folk, and formal. The EBG can use an individual user's purchase reference data to customize product lists.

A help tab screen can oil r context sensitive or general help. In another embodiment of the help function,context sensitive help can be provided via the detail or capture windows while the user is navigating through one or several of the other windows displayed in the EBG interface.

While a number of embodiments have been described, it should be apparent that modifications can be made without departing from the scope of the appended claims. For example, there are many ways that the various screens shown here could be displayed.

What is claimed is:

1. An apparatus for saving commerce related information in a broadcast programming network, comprising:
    a communications device configured to receive a list of items identifying a plurality of products and to tune to any one of multiple broadcast reception channels to receive broadcast video programming;
    a processor configured to output for display the list of items identifying a plurality of products;
    a display screen configured to display to a user the outputted list of items identifying a plurality of products, the identified plurality of products not including the multiple broadcast reception channels;
    an input device configured to enable the user to input a selection of one or more of the items from the displayed list; and
    a persistent storage device configured to store the one or more items selected from the displayed list, such that the user is able to retrieve the stored items at a later time;
    wherein the processor is further configured to cause the display of the broadcast video programming simultaneously with the list identifying a plurality of products, and the display screen is further configured to display the broadcast video programming simultaneously with the list identifying a plurality of products.

2. An apparatus according to claim 1, wherein the list identifying a plurality of products is displayed as one of (i) an overlay that covers the entire display screen, (ii) an overlay that covers a portion of the broadcast video programming, and (iii) a translucent overlay on the broadcast video programming.

3. An apparatus according to claim 1, wherein the user input is a second user input and the processor is further configured to cause display of the list identifying a plurality of products in response to a first user input requesting the display.

4. An apparatus according to claim 3, wherein:
    the communications device is further configured to receive in association with the one of the multiple reception channels to which the communications device is tuned, icon related data indicative of the availability of the list identifying a plurality of products;
    the processor is further configured to process the received icon related data and cause the display of an icon on the display screen;
    the first user input is responsive to the display of the icon.

5. An apparatus according to claim 1, wherein the list identifying a plurality of products is associated with the received broadcast video programming.

6. An apparatus according to claim 1, wherein the list identifying a plurality of products corresponds to a user preference.

7. An apparatus according to claim 1, wherein:
    the user input is a first user input and the processor is further configured to retrieve the saved items from the persistent storage device in response to a second user input;
    the communications device is further configured to receive detailed product information consisting of at least one of (i) information regarding each of the saved items itself and (ii) information regarding purchase for each of the saved items,
    the processor is further configured to cause, in response to a third user input, display of the detailed product information.

8. An apparatus according to claim 7, wherein the detailed product information is received via an out-of-band data path.

9. An apparatus according to claim 1, wherein:
    the communications device is further configured to receive a software application in connection with being tuned to the one channel;
    the processor is software configurable and is configured by the software application to provide a user interface to enable the user to receive and input information.

10. An apparatus according to claim 1, wherein the communications device and processor are housed in a set-top box.

11. An apparatus according to claim 1, wherein the persistent storage device is a database remote from the processor.

12. An apparatus according to claim 1, wherein:
the persistent storage device is further configured to store only the one or ore items selected from the displayed list, such that the user is able to retrieve only the selected one or more items at a later time.

13. An apparatus according to claim 1, wherein:
the plurality of products are a plurality of products available for ordering by the user.

14. An apparatus according to claim 1, wherein:
the input device is further configured to enable the user to input a request to retrieve the stored one or more items;
the display screen is further configured to display to the user the retrieved one or more items; and
the input device is further configured to enable the user to input a request to order at least one of the displayed one or more items.

15. A method for saving commerce related information in a broadcast programming network, comprising:
tuning to one of multiple selectable broadcast video programming reception channels;
receiving, responsive to tuning to the one channel, broadcast video programming;
receiving a list of items identifying a plurality of products, the identified plurality of products not including the multiple selectable broadcast video programming reception channels;
generating a first instruction causing display of the list of items identifying a plurality of products;
displaying the list of item identifying a plurality of products in accordance with the generated first instruction;
processing a user input selecting one or more of the items from the displayed list;
saving to a persistent storage device the one or more selected items in association with information identifying the user, such that the user is able to retrieve saved items at a later time:
generating a second instruction to cause display of the broadcast video programming simultaneously with the list identifying a plurality of products; and
displaying the broadcast video programming simultaneously with the list identifying a plurality of products, in accordance with the second instruction.

16. A method according to claim 15, wherein the list identifying a plurality of products is displayed as one of (i) an overlay that covers entirely the broadcast video programming, (ii) an overlay that covers a portion of the broadcast video programming, and (iii) a translucent overlay on the broadcast video programming.

17. A method according to claim 15, wherein the user input is a second user input and further comprising:
generating the instruction causing display of the list identifying a plurality of products, in response to a first user input requesting the display.

18. A method according o claim 17, further comprising:
receiving, in association with the one channel, icon related data indicative of the availability of the list identifying a plurality of products;
processing the received icon related data and generating a third instruction causing display of an icon; and
inputting the first user input in response to the icon.

19. A method according to claim 15, wherein the list identifying a plurality of products is associated with the received broadcast video programming.

20. A method according to claim 15, wherein the list identifying a plurality of products corresponds to a user preference.

21. A method according to claim 15, wherein the user input is a first user input, and further comprising:
retrieving the saved items from the persistent storage device in response to a second user input;
receiving detailed product information consisting of at least one of (i) information regarding each of the saved items itself, and (ii) information regarding purchase for each of the saved items;
generating in response to a third user input, another instruction causing display of the detailed product information; and
displaying the detailed product information in accordance with the other instruction.

22. A method according to claim 21, wherein the detailed product information is received via an out-of-band data path.

23. A method according to claim 15, wherein the list identifying a plurality of products is received via an out-of-band data path.

24. A method according to claim 15, wherein the persistent storage device is a database remote from the processor.

25. A method according to claim 15, wherein:
only the one or more selected items are saved in association with the information identifying the user.

26. An apparatus according to claim 15, wherein:
the plurality of products are a plurality of products available for ordering by the user.

27. An apparatus according to claim 15, further comprising:
retrieving the stored one or more items;
displaying the retrieved one or more items to the user; and
processing a user input requesting at least one of the displayed one or more items be placed on order.

* * * * *